US010706893B1

(12) United States Patent
Erickson et al.

(10) Patent No.: US 10,706,893 B1
(45) Date of Patent: Jul. 7, 2020

(54) METHOD OF TEMPORARILY SEALING DATA STORAGE DEVICE AND DEVICE

(71) Applicant: Seagate Technology LLC, Cupertino, CA (US)

(72) Inventors: Kurt LeRoy Erickson, Apple Valley, MN (US); Andrew J. Hutchinson, New Prague, MN (US); Kerry J. Mahoney, Apple Valley, MN (US); Kent J. Forbord, Minneapolis, MN (US); Paul S. Tyler, Apple Valley, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/527,938

(22) Filed: Jul. 31, 2019

(51) Int. Cl.
*G11B 33/14* (2006.01)
*G11B 33/02* (2006.01)

(52) U.S. Cl.
CPC ........ *G11B 33/022* (2013.01); *G11B 33/1446* (2013.01); *G11B 33/1466* (2013.01)

(58) Field of Classification Search
CPC ........................ G11B 33/1446; G11B 33/1466
USPC ................................ 360/97.22, 99.21, 99.22
See application file for complete search history.

(56) References Cited

U.S. PATENT DOCUMENTS

| | | | | |
|---|---|---|---|---|
| 8,400,730 B2* | 3/2013 | Uranaka | ............... | C09K 3/1021 277/654 |
| 9,508,393 B1* | 11/2016 | Le | ....................... | G11B 33/1466 |
| 9,721,620 B2* | 8/2017 | Sudo | ..................... | G11B 25/043 |
| 9,754,631 B2 | 9/2017 | Severson et al. | | |
| 9,818,454 B1* | 11/2017 | Albrecht | ............... | G11B 33/027 |
| 10,079,043 B2* | 9/2018 | Strange | ................ | G11B 25/043 |
| 2005/0264926 A1* | 12/2005 | Burts-Cooper | ...... | G11B 33/121 360/97.22 |
| 2006/0002067 A1 | 1/2006 | Gunderson et al. | | |
| 2008/0088969 A1* | 4/2008 | Uefune | ................ | G11B 25/043 360/99.21 |
| 2008/0165448 A1* | 7/2008 | Ichikawa | ............. | G11B 25/043 360/97.22 |
| 2011/0038077 A1* | 2/2011 | Uranaka | .............. | C09K 3/1021 360/99.22 |
| 2012/0275054 A1 | 11/2012 | McGuire, Jr. et al. | | |
| 2015/0332733 A1* | 11/2015 | Lapp | ........................ | H02K 5/12 360/99.08 |
| 2015/0361256 A1* | 12/2015 | Kurata | ............... | C09D 151/003 522/42 |
| 2016/0104515 A1* | 4/2016 | Strange | ................ | G11B 25/043 360/99.18 |
| 2017/0101202 A1* | 4/2017 | Fitzgerald | ............ | G11B 33/027 |

OTHER PUBLICATIONS

"Innovative Fluids That Deliver Superior Performance", The Chemours Company FC, LLC. Opteon, Vertrel, 2017, (16 pages).

* cited by examiner

*Primary Examiner* — Jefferson A Evans
(74) *Attorney, Agent, or Firm* — Kagan Binder, PLLC

(57) ABSTRACT

It has been discovered that the cavity of data storage devices may be temporarily sealed to inhibit loss of gasses from the cavity by use of a sealing solution comprising a sealing component that is in contact with the gasket of the device, so that the gasket and sealing solution, together with the structural cover and base deck of the device, temporarily seals the cavity. The sealing solution comprises a sealing component having molecular weight of from about 1000 to about 30,000 Daltons.

20 Claims, 3 Drawing Sheets

METHOD OF TEMPORARILY SEALING DATA STORAGE DEVICE AND DEVICE

BACKGROUND

The present disclosure relates to a method of temporarily sealing a data storage device and a temporarily sealed device.

Some electrically operated devices, such as data storage devices, are housed in protective enclosures. Some enclosures, also referred to as housings, may be sealed for various reasons, such as to keep out contaminants. Another reason an enclosure may be sealed is to maintain an alternate atmosphere. Some alternate atmospheres may be used to obtain certain performance advantages for some electrical, mechanical, or electro-mechanical devices.

Data storage devices that may be housed in sealed enclosures include disk drives that store data on magnetic or optical disks. For example, a hard disk drive (HDD) may store data on a magnetic disk. An HDD typically includes a base into which various components of the disk drive may be installed. A top cover cooperates with the base to form an enclosure that houses electronic and electro-mechanical components of the disk drive. These components include, for example, a spindle motor, which rotates one or more disks at high speed. Information may be written to and read from tracks on the disks through the use of an actuator assembly. The actuator assembly may include actuator arms, which extend towards the disks, with one or more suspensions or flexures extending from each of the actuator arms. Mounted at the distal end of each of the flexures is a read/write head, which may include an air bearing slider that enables the head to fly in close proximity to the corresponding surface of the associated disk.

Hard disk drives are generally sealed to prevent dust and other external sources of contamination from interfering with operation of the hard disk heads therein. Some hard disk drives are hermetically sealed. A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air. US Patent Application Publication No. 2012/0275054 describes temporary sealing of hermetic hard disk drives with an infrared-transmissive tape. US Patent Application Publication No. 2006/0002067 describes a data storage device that is sealed by a gasket.

SUMMARY

When preparing hermetically sealed hard disk drives, it is desirable to provide at least a temporary seal during factory processing, and to defer the final weld of the cover for long term sealing only after completion of processing. It has been found that during processing, the hard disk drives exhibited high leak rates during processing prior to the final weld of the cover. While not being bound by theory, it was suspected that this leaking was due to surface roughness on the mating deck surface to which the form-in-place ("FIP") gasket often used was not able to fully conform. Applying a surface coating, such as paint, was not satisfactory to solve this leaking problem, because some leakage still occurred.

It has been discovered that the cavity of data storage devices may be temporarily sealed to inhibit loss/leakage of gasses from the cavity by use of a sealing solution that is in contact with the gasket of the device, so that the gasket and sealing solution, together with the structural cover and base deck of the device, temporarily seals the cavity. The sealing solution comprises a sealing component having a weight average molecular weight of from about 1000 to about 30,000 Daltons.

In an embodiment, a data storage device comprises a base deck including a cavity defined by a plurality of sidewalls, each sidewall having an uppermost top surface and having inner surfaces; and a structural cover that encloses the cavity, the structural cover including a planar inner surface that adjoins the uppermost top surfaces of the sidewalls to enclose the cavity. A gasket is positioned so that the gasket engages the uppermost top surface of the sidewalls and the planar inner surface of the structural cover that adjoins the top surfaces of the sidewalls to enclose the cavity. A sealing solution is placed in contact with the gasket so that the gasket and sealing solution, together with the structural cover and base deck, temporarily seals the cavity to inhibit leakage of gases from the cavity.

In another embodiment, a data storage device comprises a structural cover including a cavity defined by a plurality of sidewalls, each sidewall having a lowermost bottom surface and having inner surfaces, and a base deck that encloses the cavity, the base deck including a planar inner surface that adjoins the bottom surfaces of the sidewalls to enclose the cavity. A gasket is positioned so that the gasket engages the lowermost bottom surface of the sidewalls and the planar inner surface of the base deck that adjoins the lowermost bottom surfaces of the sidewalls to enclose the cavity. A sealing solution is placed in contact with the gasket so that the gasket and sealing solution, together with the structural cover and base deck, temporarily seals the cavity to inhibit leakage of gases from the cavity.

In an embodiment, a method of temporarily sealing a data storage device comprises providing a base deck including a cavity defined by a plurality of sidewalls, each sidewall having an uppermost top surface and having inner surfaces and providing a structural cover including a planar inner surface that, when placed on the sidewalls of the base deck, adjoins the uppermost top surface of the sidewalls to enclose the cavity. A gasket is placed on either the uppermost top surface of the sidewalls or the planar inner surface of the structural cover that adjoins the uppermost top surface of the sidewalls, and a sealing solution is applied to either the gasket or surface opposing the gasket selected from the uppermost top surface of the sidewalls or the planar inner surface of the structural cover that adjoins the uppermost top surface of the sidewalls so that the gasket and sealing solution, together with the structural cover and base deck temporarily seals the cavity to inhibit leakage of gases from the cavity.

In another embodiment, a method of temporarily sealing a data storage device comprises providing a structural cover including a cavity defined by a plurality of sidewalls, each sidewall having a lowermost bottom surface and having inner surfaces and providing a base deck including a planar inner surface that, when placed on the sidewalls of the structural cover, adjoins the lowermost bottom surface of the sidewalls to enclose the cavity. A gasket is placed on either the lowermost bottom surface of the sidewalls or the planar inner surface of the base deck that adjoins the lowermost bottom surface of the sidewalls; and a sealing solution is applied to either the gasket or surface opposing the gasket selected from the lowermost bottom surface of the sidewalls or the planar inner surface of the base deck that adjoins the lowermost bottom surface of the sidewalls so that the gasket and sealing solution, together with the structural cover and base deck, temporarily seals the cavity to inhibit leakage of gases from the cavity.

The use of a sealing solution as described herein provides excellent temporary sealing of data storage devices in a manner that can be easily and inexpensively carried out. In an embodiment, the sealing solution comprises only materials that are conventionally used within data storage devices, thereby advantageously avoiding addition of new contaminants to the data storage device.

While not being bound by theory, it is believed that such a sealing solution advantageously fills in the surface imperfections and wets the mating surfaces, forming a barrier to loss of gases from the device. It is further believed that the liquid sealing component does not dry out or evaporate, but remains between the surfaces since the sealing component is contained between the gasket and the surfaces of the structural cover and base deck and therefore does not readily escape.

For purposes of the present disclosure, a "sealing solution" is a solution that comprises a sealing component, and optionally a solvent for the sealing component.

For purposes of the present disclosure, a "sealing component" is any component or mixture of components having a molecular weight of from about 1000 to about 30,000 Daltons. For purposes of the present disclosure, all molecular weight values are weight average molecular weights unless otherwise indicated.

DETAILED DESCRIPTION

Figure 1:
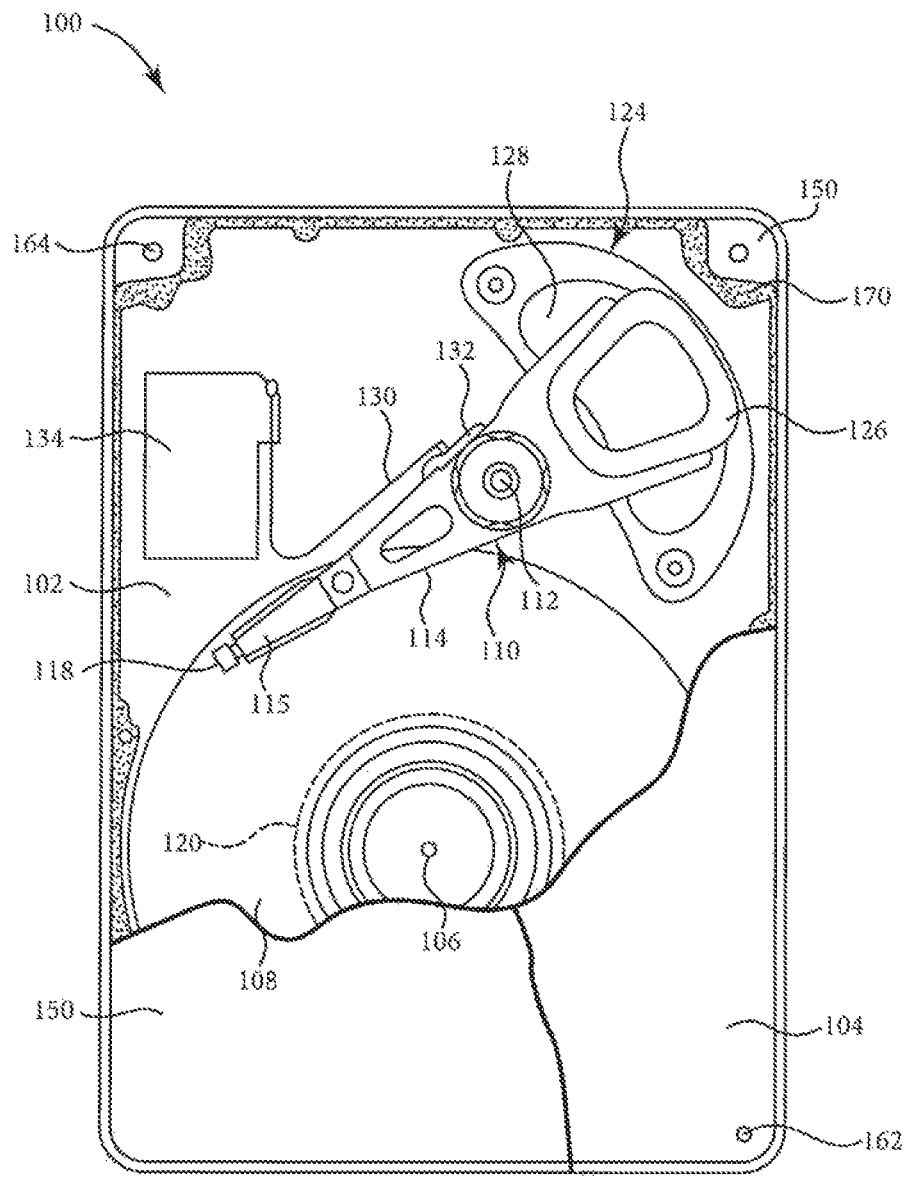
FIG. 1 is a plan view of an exemplary hard disk drive (HDD) in an enclosure.
Figure 2:
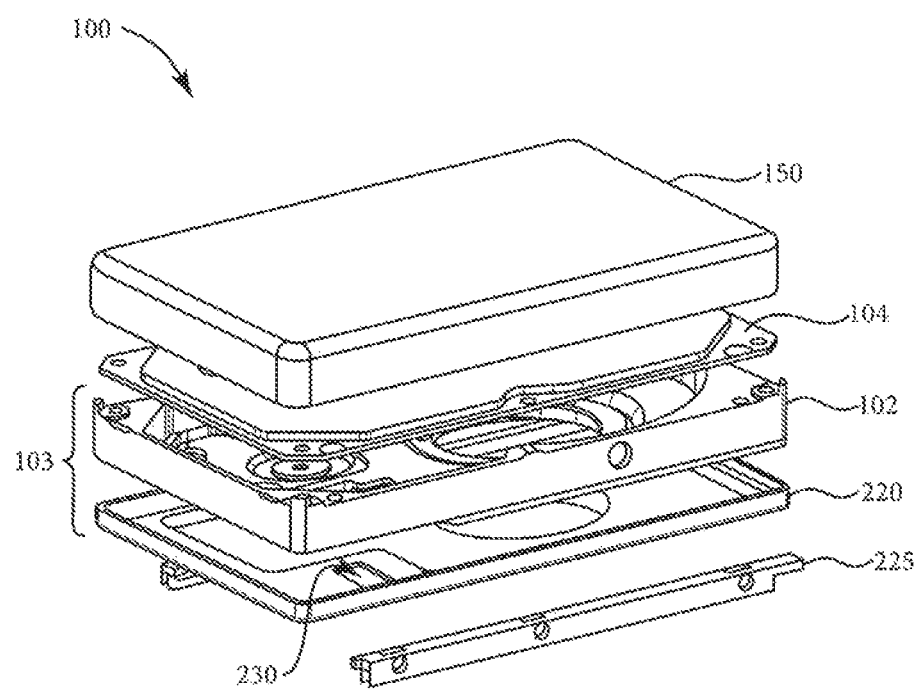
FIG. 2 is an exploded view of a sealable HDD enclosure.

An exemplary data storage device, in particular a hard disk drive ("HDD") 100 is shown in FIGS. 1 and 2. The HDD 100 includes an enclosure that can be sealed to house components within the HDD 100. The HDD 100 includes a base 102 to which various components of the disk drive 100 are mounted. A structural cover 104, shown partially cut away, cooperates with the base 102 to form a housing that defines an internal environment for the HDD. The HDD components include a spindle motor 106 that rotates one or more disks 108 at a high speed. An actuator assembly 110 writes and reads from tracks on an associated disk 108. The actuator assembly 110 rotates during a seek operation about a bearing shaft assembly 112 positioned adjacent the disks 108. The actuator assembly 110 includes one or more actuator arms 114. Each actuator arm 114 extends toward the associated disk 108. One or more flexures 115 extend from each of the actuator arms 114. Near the distal end of each of the flexures 115 is a head 118, which includes a slider that enables the head 118 to fly in close proximity above the corresponding surface of the associated disk 108.

During a seek operation, a voice coil motor 124 controls the track position of the heads 118. The voice coil motor 124 typically includes a coil 126 attached to the actuator assembly 110, as well as one or more permanent magnets 128. As the coil 126 moves, the actuator assembly 110 pivots about the bearing shaft assembly 112, the heads 118 move across the surfaces of the disks 108.

A flex assembly 130 provides electrical connection paths for the actuator assembly 110 while allowing pivotal movement of the actuator assembly 110 during operation. The flex assembly 130 includes a flex circuit 132 to which head wires (not shown) are connected. The head wires are routed along the actuator arms 114 and the flexures 115 to the heads 118. The flex circuit 132 typically includes circuitry for controlling the write currents applied to the heads 118 during a write operation, and a preamplifier for amplifying read signals generated by the heads 118 during a read operation. The flex assembly 130 is held in place by a flex bracket 134. The flex assembly provides communication through the base deck to a disk drive printed circuit board assembly (PCB assembly—not shown). The PCB assembly is mounted to the bottom side of the HDD 100, and sends and receives signals for operating the HDD 100.

The HDD 100 may be configured to operate in a helium-filled atmosphere within its enclosure.

FIG. 2 illustrates an exploded view of HDD 100, which shows the enclosure formed by the base 102, a bottom cover 220 (which are sealingly coupled together to form a base deck 103), the structural cover 104, the sealing cover 150, and optionally, mounting rails 225. In some examples, the base 102, the structural cover 104, the bottom cover 220, and the sealing cover 150, may be made of conductive metals, such as aluminum or stainless steel. Such metals have a low permeability to low density gasses, such as helium. As such, conductive metals that have low permeability to low density gasses, for example, may be suitable for maintaining the atmosphere within the enclosure. In an embodiment, the base 102 and the bottom cover 220 are sealingly coupled together by welding the exterior perimeter of a joint between the two. Various welding techniques may be used, such as tungsten inert gas welding, gas tungsten arc welding, laser welding, plasma welding, friction stir welding, and others. In an embodiment, the base 102 and the bottom cover 220 are formed as a unitary piece, and so no coupling of separate parts is required.

Figure 3:
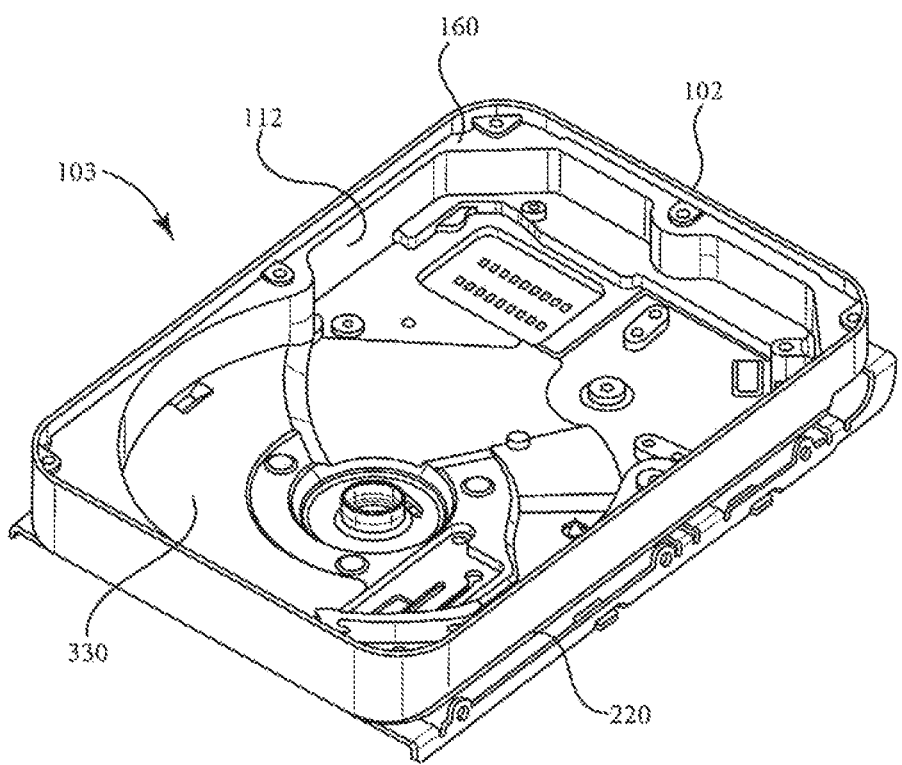
FIG. 3 is a perspective view of a sealable HDD enclosure.

FIG. 3 shows an embodiment of the base deck 103 comprising the base 102 and the bottom cover 220 in a sealingly coupled arrangement. Base deck 103 comprises a plurality of sidewalls, each sidewall having an uppermost top surface 160 and having an inner surface 112, which together define cavity 330. Gasket 170 (shown in FIG. 2) is positioned to engage the uppermost top surface of the sidewalls and the planar inner surface of the structural cover 104 that adjoins the uppermost top surface of the sidewalls to enclose the cavity. A sealing solution (not shown) is placed in contact with the gasket so that the gasket and sealing solution, together with the structural cover and base deck, temporarily seals the cavity. In an embodiment, the sealing solution is applied to both the structural cover and base deck at the location of the gasket to facilitate temporary sealing of the cavity.

While not being bound by theory, it is believed that the sealing solution improves the effectiveness of the mechanical seal by filling in remaining surface imperfections and wetting to the mating surfaces. The sealing solution is believed to bridge any gaps between the gasket and the surfaces of the structural cover and base deck, increasing the length of the leakage path, and therefore reducing the helium leak rate from the HDD.

Gasket 170 may be prepared from any material that inhibits leakage of helium from the cavity. In an embodiment, the gasket is an elastomer gasket. In an embodiment, the gasket is made from a fluoroelastomer. In an embodiment, the gasket is made from a material selected from acrylate, epoxy, urethane and synthetic rubber.

An example of a suitable gasket material for the gasket 170 is manufactured by Zeon Chemical L.P. of Louisville, Ky., and has a permeation rate of less than $10 \times 10^{-8}$ centimeters squared per second×atmosphere ("$cm^2/sec*atm$"). In one example, the gasket 170 may have a leak rate of less than $5 \times 10^{-7}$ cc/sec of helium for a disk drive having an internal volume of approximately 100 cc (cubic centimeters). Additional examples of suitable gasket materials include form in place gaskets, such as Huntsman brand TX09 gaskets or Dexerials brand—DEX 65 gaskets.

The structural cover 104 may, in some examples, include a valve (not shown) for filling the HDD 100 with a low density gas, such as helium.

The sealing solution used for temporarily sealing the cavity comprises a sealing component, together with an optional solvent for the sealing component, to provide a sealing solution that can be readily applied to the gasket and/or the mating surface.

As noted above, the sealing solution is a component or mixture of components that is a liquid (i.e. is flowable) at 23° C. This embodiment is advantageous in that the sealing solution can be readily applied to the gasket and/or the mating surface using ordinary liquid application systems. In an embodiment, the sealing solution is a liquid at 65° C. and is highly viscous at 23° C. This embodiment is advantageous in that the sealing solution can be readily applied to the gasket and/or the mating surface using a heated dispensing system, and will remain in place without spreading upon cooling.

In an embodiment, the sealing component itself is a component or mixture of components that is a liquid (i.e. is flowable) at 23° C. In an embodiment, the sealing component is a liquid at 65° C., and is highly viscous at 23° C. This embodiment is advantageous in that the sealing component will remain in place without spreading upon cooling or upon evaporation or other loss of the solvent component of a sealing solution.

In an embodiment, the sealing component has a molecular weight of from about 1000 to 25,000 Daltons. In an embodiment, the sealing component has a molecular weight of from about 1000 to 20,000 Daltons. In an embodiment, the sealing component has a molecular weight of from about 1000 to 15,000 Daltons. In an embodiment, the sealing component has a molecular weight of from about 1000 to 12,000 Daltons. In an embodiment, the sealing component has a molecular weight of from about 1000 to 12,000 Daltons. In an embodiment, the sealing component has a molecular weight of from about 1000 to 10,000 Daltons. In an embodiment, the sealing component has a molecular weight of from about 1000 to 8000 Daltons. In an embodiment, the sealing component has a molecular weight of from about 1000 to 6000 Daltons. In an embodiment, the sealing component has a molecular weight of from about 1000 to 4000 Daltons. In an embodiment, the sealing component is a perfluoropolyether lubricant having a molecular weight of from about 1000 to 3000 Daltons. In an embodiment, the sealing component is a perfluoropolyether lubricant having a molecular weight of from about 1200 to 2200 Daltons.

Kinematic viscosity is the measure of a fluid's inherent resistance to flow when no external force, except gravity, is acting on it. For purposes of the present invention, the Kinematic viscosity of either the sealing solution or the sealing component is measured using a Zahn Cup-Type Viscosimeter from Weber Scientific (Hamilton, N.J.) at liquid temperature of 77° F. (25° C.) in accordance with ASTM # D 4212-99 (reapproved 2005): "Viscosity by dip-type viscosity cups." Viscosity is reported in centistokes (cSt).

In an embodiment, the sealing solution has a kinematic viscosity of from about 0.3 to about 5000 cSt. In an embodiment, the sealing solution has a kinematic viscosity of from about 1 to about 1000 cSt. In an embodiment, the sealing solution has a kinematic viscosity of from about 1 to about 500 cSt. In an embodiment, the sealing solution has a kinematic viscosity of from about 1 to about 100 cSt. In an embodiment, the sealing solution has a kinematic viscosity of from about 1 to about 50 cSt.

In an embodiment, the sealing component has a kinematic viscosity of from about from about 1 to about 5000 cSt. In an embodiment, the sealing component has a kinematic viscosity of from about from about 5 to about 3000 cSt. In an embodiment, the sealing component has a kinematic viscosity of from about from about 5 to about 2000 cSt. In an embodiment, the sealing component has a kinematic viscosity of from about from about 5 to about 1000 cSt. In an embodiment, the sealing component has a kinematic viscosity of from about from about 5 to about 750 cSt. In an embodiment, the sealing component has a kinematic viscosity of from about from about 10 to about 500 cSt. In an embodiment, the sealing component has a kinematic viscosity of from about from about 200 to about 5000 cSt. In an embodiment, the sealing component has a kinematic viscosity of from about from about 500 to about 5000 cSt. In an embodiment, the sealing component has a kinematic viscosity of from about from about 1000 to about 5000 cSt.

In an embodiment, the sealing component may be selected from perfluoropolyether, polyphenylether, silicone, synthetic ester, synthetic hydrocarbon, phosphazene or polyglycol lubricants.

In an embodiment, the sealing component is a perfluoropolyether lubricant, such as Fomblin® Y and Fomblin® M/Z perfluoropolyether fluids, Fomblin® Z-Tetraol, Fomblin® Z-Tetraol S, Fomblin® Z-Tetetral GT, or ZTMD.Fomblin® Z-dolT, Fomblin Z-DOL, Fomblin AM-2001, Fomblin Z-25, Demnum SP-3, and Demnum SA.

In an embodiment, the sealing component is a cyclic phosphazene lubricant, such as Dow Chemical X-1P.

In an embodiment, the sealing component is provided in a solvent to facilitate delivery of the sealing component to the intended location on the parts of the device. In an embodiment, the sealing component may be provided in a fluorinated solvent. In an embodiment, the sealing component may be provided in a hydrofluorocarbon fluid. In an embodiment, the sealing component may be provided in a hydrofluoroether fluid. The solvent should be chosen to match the sealing chemical such that a uniform film of the chemical can be laid down on the surface.

In an embodiment, the solvent has a boiling point of from about 40° C. to about 70° C. In an embodiment, the solvent has a vapor pressure of from about 25 kPa to about 35 kPa.

In an embodiment, the solvent has a molecular weight of from about 150 to about 500 Daltons. In an embodiment, the solvent has a molecular weight of from about 200 to about 400 Daltons. In an embodiment, the solvent has a molecular weight of from about 220 to about 350 Daltons. In an embodiment, the solvent has a viscosity of 50 cSt or less. In an embodiment, the solvent has a viscosity of 10 cSt or less. In an embodiment, the solvent has a viscosity of 5 cSt or less. In an embodiment, the solvent has a viscosity of 2 cSt or less. In an embodiment, the solvent has a viscosity of 1 cSt or less. In an embodiment, the solvent has a viscosity of from 0.3 cSt to 50 cSt. In an embodiment, the solvent has a viscosity of from 0.3 cSt to 10 cSt. In an embodiment, the solvent has a viscosity of from 0.3 cSt to 5 cSt. In an embodiment, the solvent has a viscosity of from 0.3 cSt to 2 cSt. In an embodiment, the solvent has a viscosity of from 0.3 cSt to 1 cSt.

In an embodiment, the sealing solution comprises a hydrofluoroether solvent selected from 3M™ Novec™ 7300 Engineered Fluid; HFE-7100 by 3M Company; DuPont's Vertrel® XF, or Asahi Glass AE-3000. In an embodiment, the sealing solution comprises a hydrofluorocarbon fluid selected from FC-77™ by 3M Company and PF5060™ by 3M Company.

In an embodiment, the sealing component may be mixed with two immiscible solvents, such as an organic solvent and a perfluorinated solvent. In an embodiment, the organic solvent may be selected from tetrahydrofuran (THF), benzene, methylbenzene, or the like. In an embodiment, the perfluorinated solvent may be selected from FC-77™, HFE 7100™, PF5060™, and the like.

In an embodiment, the sealing component is provided neat, i.e. without a solvent. In an embodiment, the sealing component is provided in a solvent as from 1 to 99 wt % of the total sealing solution (i.e. sealing component/total sealing solution). In an embodiment, the sealing component is provided in a solvent as from 1 to 90 wt % of the total sealing solution. In an embodiment, the sealing component is provided in a solvent as from 1 to 80 wt % of the total sealing solution. In an embodiment, the sealing component is provided in a solvent as from 1 to 70 wt % of the total sealing solution. In an embodiment, the sealing component is provided in a solvent as from 1 to 60 wt % of the total sealing solution. In an embodiment, the sealing component is provided in a solvent as from 1 to 50 wt % of the total sealing solution. In an embodiment, the sealing component is provided in a solvent as from 1 to 40 wt % of the total sealing solution. In an embodiment, the sealing component is provided in a solvent as from 1 to 30 wt % of the total sealing solution. In an embodiment, the sealing component is provided in a solvent as from 1 to 20 wt % of the total sealing solution. In an embodiment, the sealing component is provided in a solvent as from 1 to 15 wt % of the total sealing solution. In an embodiment, the sealing component is provided in a solvent as from 1 to 10 wt % of the total sealing solution. In an embodiment, the sealing component is provided in a solvent as from 1 to 8 wt % of the total sealing solution. In an embodiment, the sealing component is provided in a solvent as from 1 to 5 wt % of the total sealing solution.

In an embodiment, the sealing component is provided in a solvent as from 50 to 90 wt % of the total sealing solution. In an embodiment, the sealing component is provided in a solvent as from 70 to 90 wt % of the total sealing solution. In an embodiment, the sealing component is provided in a solvent as from 30 to 70 wt % of the total sealing solution. In an embodiment, the sealing component is provided in a solvent as from 40 to 60 wt % of the total sealing solution. In an embodiment, the sealing component is provided in a solvent as from 20 to 40 wt % of the total sealing solution. In an embodiment, the sealing component is provided in a solvent as from 2 to 10 wt % of the total sealing solution. In an embodiment, the sealing component is provided in a solvent as from 2 to 8 wt % of the total sealing solution. In an embodiment, the sealing component is provided in a solvent as from 3 to 5 wt % of the total sealing solution.

The temporary seal permits testing, rework, and any other required steps in this stage of assembly to be readily performed as necessary. In an embodiment present construction provides a temporary seal that maintains the helium atmosphere long enough to conduct certification testing. In an embodiment, the thus created temporary seal maintains the helium atmosphere for a time of at least 5 days. In an embodiment, the thus created temporary seal maintains the helium atmosphere for a time of at least 10 days, or of at least 15 days, or of at least 20 days, or of at least 25 days, or of at least 30 days, or of at least 40 days, or of at least 50 days, or of at least 60 days. For purposes of the present discussion, the helium atmosphere is considered to be maintained if no more than about 10% of the helium is lost from the sealed cavity.

In an embodiment, loss of helium from the sealed cavity is determined by measurement of pressure change by a pressure sensor located inside the sealed cavity.

After completion of manufacture, testing, rework, and any other required steps, the data storage is then permanently sealed. As illustrated by example in FIG. 2, such a permanent hermetic seal may in an embodiment be provided through the use of a sealing cover 150. In one example, the sealing cover 150 may be welded or brazed to the base deck or to the structural cover 104. In another example, a bottom cover may first be adhesively bonded to seal any leakage paths in the bottom of the base deck. Then, the sealing cover 150 may be sealably bonded, by welding or adhesive bonding, to the bottom cover to seal any leakage paths in the top of the base deck. In the latter example, the bottom cover and the sealing cover 150 may provide, in effect, a conductive skin that sealably envelops the base, except for an aperture for making electrical connection to the bulkhead connector.

The sealing cover 150 may be a thin-walled metal cover having a flat top surface and downward-depending sides. In some examples, the sealing cover 150 may be formed of aluminum or brass. For example, a low-profile sealing cover 150 may be formed of aluminum or brass having a thickness of approximately 0.010 inches. Such materials are characterized by a low permeability to helium or other low density gasses. In other examples, the sealing cover 150 may be formed of other materials, such as stainless steel, that are characterized by low permeability to helium.

The sealing cover 150 may be attached to the HDD 100 by, for example, a weld around the perimeter of the base deck. Thus, the sealing cover 150 creates a hermetic seal that may maintain effective concentrations of helium (or other low density gasses) within the HDD 100 over the service life of the drive.

What is claimed is:

1. A data storage device comprising:
    a base deck including a cavity defined by a plurality of sidewalls, each sidewall having an uppermost top surface and at least one inner surface;
    a structural cover that encloses the cavity, the structural cover including a planar inner surface that adjoins the uppermost top surfaces of the sidewalls to enclose the cavity,
    a gasket positioned so that the gasket engages the uppermost top surface of the sidewalls and the planar inner surface of the structural cover that adjoins the uppermost top surface of the sidewalls to enclose the cavity; and
    a sealing solution in contact with the gasket so that the gasket and sealing solution together with the structural cover and base deck at least temporarily seals the cavity to inhibit leakage of gases from the cavity, wherein the sealing solution comprises a sealing component having molecular weight of from about 1000 to about 30,000 Daltons.

2. The data storage device of claim 1, wherein the sealing component is selected from perfluoropolyether, polyphenylether, silicone, synthetic ester, synthetic hydrocarbon, phosphazene or polyglycol lubricants.

3. The data storage device of claim 1, wherein the sealing component is selected from perfluoropolyether lubricants.

4. The data storage device of claim 1, wherein the sealing component has a molecular weight of from about 1000 to 12,000 Daltons.

5. The data storage device of claim 1, wherein the sealing component is a perfluoropolyether lubricant having a molecular weight of from about 1000 to 4000 Daltons.

6. The data storage device of claim 1, wherein the sealing component has a kinematic viscosity of from about 1 to about 5000.

7. The data storage device of claim 1, wherein the sealing component is a perfluoropolyether lubricant having a kinematic viscosity of from about 15 to about 1500.

8. The data storage device of claim 1, wherein the sealing solution comprises a solvent selected from fluorinated fluids.

9. The data storage device of claim 1, wherein the sealing solution comprises a solvent selected from hydrofluoroether solvents.

10. The data storage device of claim 1, wherein the sealing solution comprises a solvent having a boiling point of from about 40° C. to about 70° C.

11. The data storage device of claim 1, wherein the sealing solution comprises a solvent having a vapor pressure of from about 25 kPa to about 35 kPa.

12. The data storage device of claim 1, wherein the sealing solution comprises a solvent having a molecular weight of from about 200 to 400 Daltons.

13. The data storage device of claim 1, wherein the sealing solution comprises a solvent having a viscosity of less than 5 cSt.

14. The data storage device of claim 1, wherein the sealing component is provided in a solvent as from 1 to 40 wt % of the total sealing solution.

15. The data storage device of claim 1, wherein the sealing component is provided in a solvent as from 2 to 10 wt % of the total sealing solution.

16. The data storage device of claim 1, wherein the temporary seal maintains the helium atmosphere for a time of at least 5 days.

17. The data storage device of claim 1, wherein the temporary seal maintains the helium atmosphere for a time of at least 20 days.

18. A data storage device comprising:
    a structural cover including a cavity defined by a plurality of sidewalls, each sidewall having a lowermost bottom surface and at least one inner surface;
    a base deck that encloses the cavity, the base deck including a planar inner surface that adjoins the lowermost bottom surface of the sidewalls to enclose the cavity,
    a gasket positioned so that the gasket engages the lowermost bottom surface of the sidewalls and the planar inner surface of the base deck that adjoins the lowermost bottom surfaces of the sidewalls to enclose the cavity; and
    a sealing solution in contact with the gasket so that the gasket and sealing solution together with the structural cover and base deck temporarily seals the cavity to inhibit leakage of gases from the cavity, wherein the sealing solution comprises a sealing component having molecular weight of from about 1000 to about 30,000 Daltons.

19. A method of temporarily sealing a data storage device comprising providing a base deck including a cavity defined by a plurality of sidewalls,
    each sidewall having an uppermost top surface and at least one inner surface;
    providing a structural cover including a planar inner surface that, when placed on the sidewalls of the base deck, adjoins the uppermost top surface of the sidewalls to enclose the cavity;
    placing a gasket on either the uppermost top surface of the sidewalls or the planar inner surface of the structural cover that adjoins the uppermost top surface of the sidewalls; and
    applying a sealing solution to either the gasket or surface opposing the gasket selected from the uppermost top surface of the sidewalls or the planar inner surface of the structural cover that adjoins the uppermost top surface of the sidewalls so that the gasket and the sealing solution, together with the structural cover and base deck temporarily seals the cavity to inhibit leakage of gases from the cavity, wherein the sealing solution comprises a sealing component having molecular weight of from about 1000 to about 30,000 Daltons.

20. A method of temporarily sealing a data storage device comprising
    providing a structural cover including a cavity defined by a plurality of sidewalls, each sidewall having a lowermost bottom surface and at least one inner surface;
    providing a base deck including a planar inner surface that, when placed on the sidewalls of the structural cover, adjoins the lowermost bottom surface of the sidewalls to enclose the cavity;
    placing a gasket on either the lowermost bottom surface of the sidewalls or the planar inner surface of the base deck that adjoins the lowermost bottom surface of the sidewalls; and
    applying a sealing solution to either the gasket or surface opposing the gasket selected from the lowermost bottom surface of the sidewalls or the planar inner surface of the base deck that adjoins the lowermost bottom surface of the sidewalls so that the gasket and the sealing solution, together with the structural cover and base deck, temporarily seals the cavity to inhibit leakage of gases from the cavity, wherein the sealing solution comprises a sealing component having molecular weight of from about 1000 to about 30,000 Daltons.

\* \* \* \* \*